United States Patent
Weiler et al.

(10) Patent No.: US 6,725,205 B1
(45) Date of Patent: Apr. 20, 2004

(54) SYSTEM AND METHOD FOR SECURE SOFTWARE INSTALLATION

(75) Inventors: Jonathan Frederic Weiler, Palo Alto, CA (US); Charles Garizas, San Jose, CA (US); Keyush Dhirajlal Shah, Santa Clara, CA (US)

(73) Assignee: Ulysses ESD, Inc., San Jose, CA (US)

( * ) Notice: Subject to any disclaimer, the term of this patent is extended or adjusted under 35 U.S.C. 154(b) by 0 days.

(21) Appl. No.: 09/453,011

(22) Filed: Dec. 2, 1999

(51) Int. Cl.$^7$ ............................................. G06F 17/60
(52) U.S. Cl. ............................. 705/57; 705/56; 705/58; 705/59; 713/1; 713/191
(58) Field of Search .......................... 705/57, 56, 58, 705/59; 713/191, 1, 187, 200; 717/11

(56) References Cited

U.S. PATENT DOCUMENTS

| | | | |
|---|---|---|---|
| 4,562,306 A | * 12/1985 | Chou et al. | 178/22.08 |
| 4,688,169 A | * 8/1987 | Joshi | 364/200 |
| 4,817,140 A | * 3/1989 | Chandra et al. | 380/4 |
| 4,866,769 A | * 9/1989 | Karp | 380/4 |
| 5,199,066 A | * 3/1993 | Logan | 380/4 |
| 5,287,408 A | * 2/1994 | Samson | 380/4 |
| 5,379,433 A | * 1/1995 | Yamagishi | 380/4 |
| 5,555,304 A | * 9/1996 | Hasebe et al. | 380/4 |
| 5,615,061 A | * 3/1997 | Singh | 360/60 |
| 5,745,568 A | * 4/1998 | O'Connor et al. | 380/4 |
| 5,790,663 A | * 8/1998 | Lee et al. | 380/4 |
| 6,023,763 A | * 2/2000 | Grumstrup et al. | 713/200 |
| 6,067,618 A | * 5/2000 | Weber | 713/1 |
| 6,075,862 A | * 6/2000 | Yoshida et al. | 380/28 |
| 6,134,659 A | * 10/2000 | Sprong et al. | 713/190 |
| 6,226,747 B1 | * 5/2001 | Larsson et al. | 713/200 |
| 6,243,468 B1 | * 6/2001 | Pearce et al. | 380/255 |
| 6,243,796 B1 | * 6/2001 | Otsuka | 711/163 |
| 6,247,131 B1 | * 6/2001 | Kotani et al. | 713/200 |
| 6,278,984 B1 | * 8/2001 | Itami et al. | 705/57 |
| 6,453,369 B1 | * 9/2002 | Imamura et al. | 710/36 |
| 6,453,413 B1 | * 9/2002 | Chen et al. | 713/2 |

FOREIGN PATENT DOCUMENTS

WO    WO 99/26123    * 5/1999

OTHER PUBLICATIONS

Morrissey, Jane, "Latest NetWare Release Drops Copy Protection: 3Com, Novell Make LAN Moves", PC Week, vol. 5, No. 37, Sep. 12, 1988.*

Norton, P., "By Popular Demand: More On the Copy–Protection Issue", PC Week, vol. 2, No. 2, p. 26, Jan. 15, 1995.*

Ramsey, David, "Ask David Ramsey", MacWeek, vol. 7, No. 15, p. 64, Apr. 12, 1993.*

Methvin, Dave, "Foothill Industries", PC Week, vol. 8, No. 39, p. 87, Sep. 30, 1991.*

\* cited by examiner

*Primary Examiner*—John W. Hayes
(74) *Attorney, Agent, or Firm*—Morgan, Lewis & Bockius LLP

(57) ABSTRACT

A method secures software in a computer system that has one or more fixed disk drives. Each fixed disk drive is configured with a predetermined system serial number, such that each fixed disk drive has the same system serial number. Software is received with an associated target serial number. The associated target serial number is compared to the system serial number on every fixed disk drive. The file is installed when the system serial number on every fixed disk drive is the same as the associated target serial number. A computer program product embodies the method described above.

22 Claims, 4 Drawing Sheets

Method of Configuring a Hard Disk Drive with the System Serial Number (Disk Installation Procedure)

Method of Installing Software in a Voice Mail Server with a System Serial Number (Software Installation Procedure)

Method of Installing Software in a Voice Mail Server
with a System Serial Number (Software Installation Procedure)

SYSTEM AND METHOD FOR SECURE SOFTWARE INSTALLATION

The present invention relates generally to computer systems, and particularly to a system and method for protecting software in a voice mail server.

BACKGROUND OF THE INVENTION

Data storage systems such as voice mail servers store and retrieve data such as phone messages for a large user base. This user base may consist of tens, hundreds or even thousands of users. Because the voice mail servers service a large user base, the voice mail servers must be capable of simultaneously storing and retrieving multiple phone messages. The voice mail server stores each phone message in a set of disks. Users periodically retrieve these stored phone messages through a user interface. This user interface provides the user with several options for handling the stored messages such as reviewing, forwarding, deleting, or keeping stored messages. Typically, the voice mail server has the ability to store dozens of messages for each user. In addition, a voice mail server servicing hundreds or thousands of users may, during peak usage, be required to simultaneously store many dozens of voice mail messages.

Each stored phone message occupies a significant amount of disk storage space. Consequently, a set of disk drives is provided that has a correspondingly large data storage capability. Typically, the disk drives are hard disk drives. When the voice mail server receives a voice message that is to be stored, the voice mail server selects a hard disk drive, and writes the voice message to the selected hard disk drive.

Typically, the voice mail server is implemented as an application program or a set of application programs. One of the hard disk drives is designated as a master disk which stores an operating system and the application program software. Depending on the system configuration, the master disk may also store voice mail messages.

In the voice mail server, each hard disk drive is associated with a unique disk drive serial number which is stored in a predetermined location on the hard disk drive.

In some applications, software is sold or licensed on a per-system basis. Typically, the software is distributed on removable media such as a floppy disk or CD-ROM. To secure the software from unauthorized use on a different system, the software distribution medium includes a list with the unique disk drive serial number for each hard disk drive of the system. When installing the software from the distribution medium, an installation procedure compares the unique disk drive serial number on the medium to the disk drive serial number of each hard disk drive in the system, including the master disk drive. The installation procedure installs the software only if every unique serial number on the distribution medium matches the disk drive serial number of a hard diskdrive in the system. If a serial number of a hard disk drive was not found, or if a hard disk drive had a serial number that was not on the medium, the software installation procedure will not install the software.

Hard disk drives fail and need to be replaced. Every time that a hard disk drive is replaced on a particular system, the vendor needs to update a list of disk drive serial numbers that will be stored on the software distribution medium. The serial number of the hard disk drive that was replaced needs to be removed, and the serial number of the replacement disk drive needs to be added. In addition, hard disk drives may be added to increase system capacity. When a hard disk drive is added, the serial number of the new disk drive needs to be added to the list. Maintaining the list of hard disk drives for each system is time-consuming and prone to error.

Other well-known methods of protecting software include issuing license keys that are checked at run-time on a particular computer; using keys that are available from a network server; providing physical hardware keys; and encrypting the program or critical call addresses in the program. These methods also have disadvantages. Checking license keys at run-time imposes overhead on the application. Program or call decryption during run-time imposes overhead on the application. Physical hardware keys can fail, become lost, or conflict with other hardware in the system. Because telephony applications operate in real-time, outages are unacceptable.

Therefore a system and method are needed that provides software security and simplifies administration of software distribution.

SUMMARY OF THE INVENTION

A system serial number secures software in a computer system. The system serial number is used to authenticate disk drives and software in a particular computer system having one or more fixed disk drives. Each fixed disk drive is configured with a predetermined system serial number, such that each fixed disk drive has the same predetermined system serial number. Software is received with an associated target serial number. The target serial number is compared to the predetermined system serial number on every fixed disk drive. The file is installed when the system serial number on every fixed disk drive is the same as the target serial number.

Alternately, the target serial number associated with the software is provided in an encrypted form, and the system serial numbers are stored in an encrypted form.

In another alternate embodiment, the system serial number is the same as the central processing unit (CPU) serial number.

In yet another alternate embodiment, a computer program product embodies the method of the present invention.

By providing a uniform system serial number for distributing new and upgraded software, the vendor's administration efforts are reduced. By encrypting the serial number on the software distribution medium and on the hard disk drives, system security is further enhanced.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
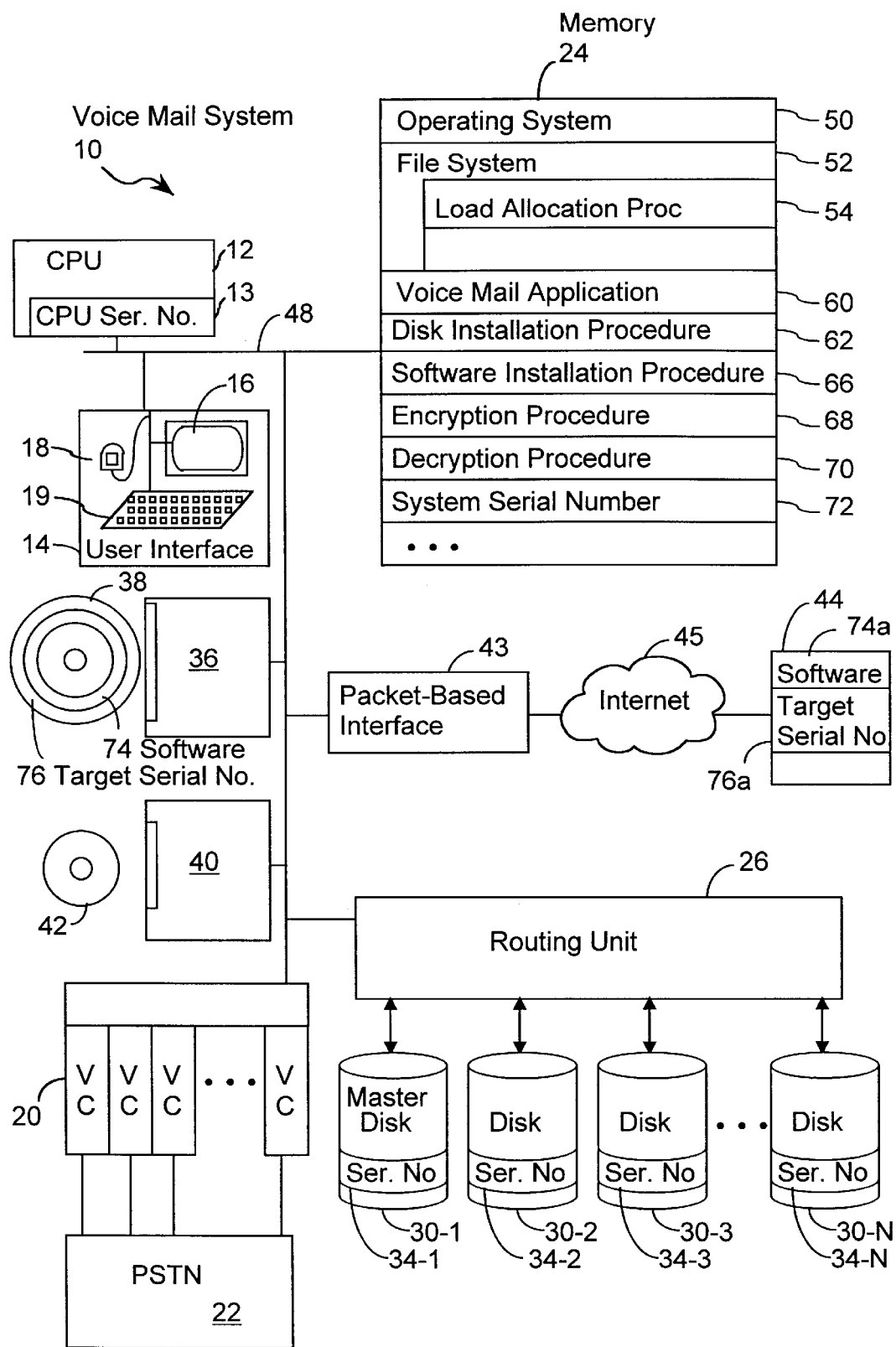
FIG. 1 is a block diagram of a voice mail server in accordance with the present invention.

In FIG. 1, a voice mail server 10 stores and retrieves messages. The voice mail server 10 is a particular type of computer system and preferably includes:

a data processor (CPU) 12 that may include a unique CPU serial number 13;

a user interface 14, including a display 16 and one or more input devices, such as a mouse 18 and a keyboard 19;

one or more voice cards (VC) 20 for receiving phone calls from a public switched telephone network 22;

memory 24, which may include random access memory as well as disk storage 30 and other storage media;

a routing unit 26 for routing incoming messages to one of a plurality of disks 30;

a floppy disk drive 36 for retrieving information from and storing information to a floppy disk 38; the information includes programs and data;

an optical disk drive 40 for retrieving information from and storing information to an optical disk 42 such as a CD-ROM;

a packet-based interface 43 for connecting to a remote server 44 via a packet switched network 45 such as the Internet; and one or more buses 48 for interconnecting the aforementioned elements of the system.

The operation of the voice mail server 10 is controlled primarily by control programs that are executed by the system's processor 12. In a typical implementation, the programs stored in the system memory 24 include:

an operating system 50 that includes procedures for handling various basic system services and for performing hardware dependent tasks; the operating system 50 may include a set of user interface procedures for handling input received from the user interface 14 and displaying the output to the user on the display 16;

a file handling system 52, including a load allocation procedure 54, for determining which disk 30 should be assigned a disk write request;

a voice mail application 60 for controlling the storage and retrieval of phone messages from the disks 30;

a disk installation procedure 62 in accordance with the present invention that is executed when a hard disk drive is installed, removed or replaced; the disk installation procedure 62 configures the hard disk drives 30 by writing a uniform system serial number 34 on the hard disk drives 30;

a software installation procedure 66 in accordance with the present invention that installs new and upgraded software in the voice mail system 10;

an encryption procedure 68 to encrypt data; and a decryption procedure 70 to decrypt data.

The software installation procedure 66 is preferably initially stored on the software distribution medium with the new and upgraded software, and is copied to the memory 24 for execution. The memory 24 also stores a target system serial number 72 that is retrieved from the software distribution medium when new or upgraded software is installed. As used herein, the term "software" includes both executable and non-executable files, and data received via the distribution medium.

One of the hard disk drives 30-1 is designated as a master disk. The master disk 30-1 provides persistent storage for the programs and data listed above with respect to the memory 24.

When the voice mail system 10 is operating, the voice cards 20 receive voice messages from the public switched telephone network 22. For each incoming voice message, the voice mail application 60 sends a sequence of disk write requests to the load allocation procedure 54. For instance, a separate disk write request may be generated for each block of compressed, encoded voice data of a particular size. The load allocation procedure 54 assigns each disk write request to a particular hard disk drive 30. Once a disk write request has been assigned to a selected disk 30, the file system 52 sends a signal to the routing unit 26 to store the data associated with the disk write request on the selected disk 30.

To prevent unauthorized use and copying of software, the vendor assigns a unique system serial number to each system installation. When upgrading or adding software to the voice mail system 10, a floppy disk 38 may be used as the software distribution medium. The floppy disk 38 stores new and upgraded software 74 with an associated target system serial number 76. Preferably the target system serial number 76 is stored in a file on the software distribution medium. In one embodiment, the target serial number is stored in a hidden file. Alternately, the target system serial number 76 is stored in a predetermined location of the software distribution medium. In an alternate embodiment, an optical disk 42 is the software distribution medium. In yet another embodiment, the new and upgraded software 74a with the associated system serial number 76a is retrieved from the remote server 44 via the Internet 45.

To prevent the new and upgraded software from unauthorized copying and distribution, the present invention provides a uniform system serial number to associate particular software with a particular system. Only one instance of the serial number is used to authenticate the software and hard disk drives on the particular system. In a system having multiple hard disk drives, to install new or upgraded software, every hard disk drive must have the same serial number as the target serial number associated with the new or upgraded software. Therefore, the vendor's efforts to support the system are reduced because only one serial number per system needs to be tracked. In addition, system availability is increased because the likelihood of errors during installation is reduced.

Prior to executing the disk installation procedure 62, the vendor configures the disk drive serial number 34 of each new hard disk drive to be added to the system with a predetermined generic serial number. To install the new disk, the disk installation procedure 62 reads the disk drive serial number. When the disk drive serial number matches the predetermined generic serial number, the disk installation procedure 62 converts the generic serial number 34 on the new hard disk drive 30 to the system serial number 34. Therefore, after executing the disk installation procedure 62, all the hard disk drives 30 in a particular system have the same serial number.

However, when the disk drive serial number of the new hard disk drive does not match the generic serial number, the disk installation procedure 62 does not place the system serial number on the new hard disk drive. Therefore, new and upgraded software received in the future may not be installed.

Figure 2:
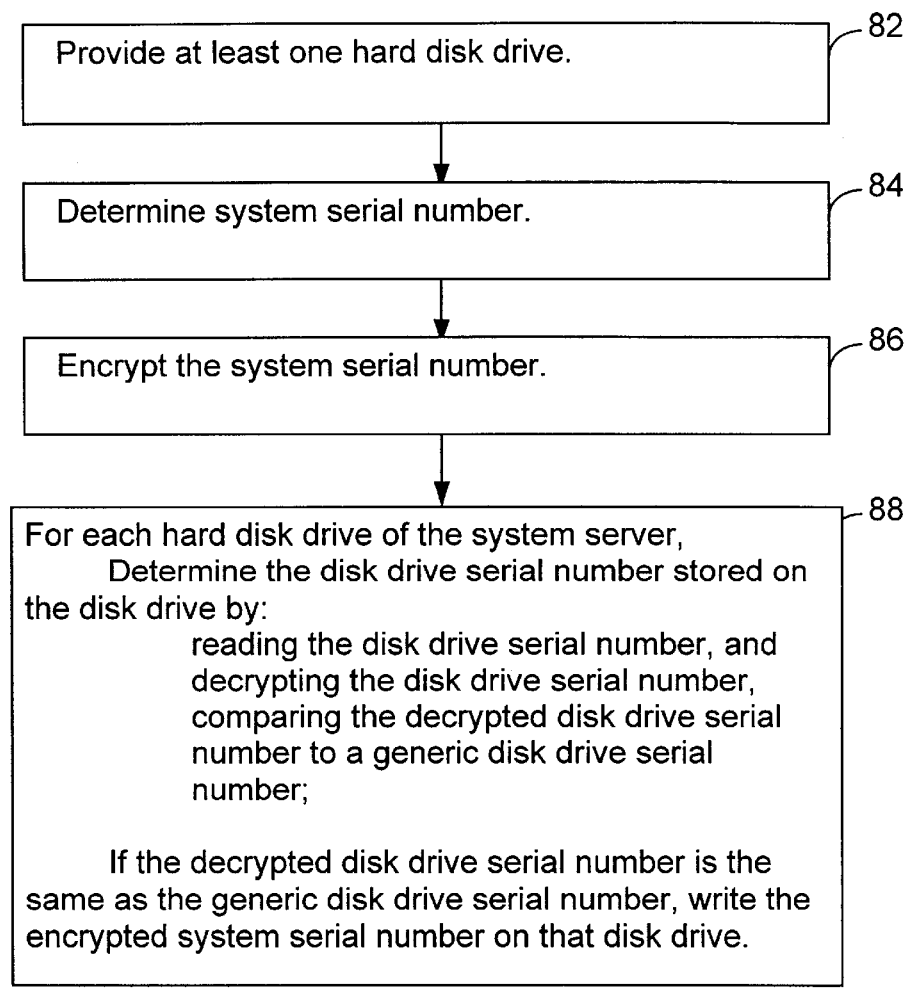
FIG. 2 is a flowchart of a method of configuring the disks of the voice mail server of FIG. 1 with the system serial number in accordance with the present invention.

Referring to both FIGS. 1 and 2, the method of configuring a hard disk drive with the system serial number in the disk installation procedure 62 will be described. In step 82, at least one hard disk drive 30 is provided, and the hard disk drive 30 has a unique serial number. In step 84, the disk installation procedure 62 determines the system serial number. In one embodiment, the disk installation procedure 62 determines the system serial number by reading the system serial number from the predetermined location, such as sector zero, on the software distribution medium.

Alternately, the system serial number is the CPU serial number 13, which is read from the CPU 12. In step 86, the disk installation procedure 62 calls the encryption procedure 68 to encrypt the system serial number. In step 88, for each hard disk drive of the voice mail system, the disk installation procedure 62 determines whether the disk drive serial number 34 of the hard disk drive 30 is the same as the generic serial number by reading the disk drive serial number 34 from the hard disk drive 30, decrypting the disk drive serial number 34, and comparing the decrypted disk drive serial number to the generic serial number. If the decrypted disk drive serial number is the same as the generic serial number, the disk installation procedure 62 writes the encrypted system serial number on that hard disk drive 30.

The target serial numbers on the software distribution medium and the hard disk drives may be stored using the same or different encryption keys. Preferably, the target system serial number is encrypted using a first key, and stored on the software distribution medium in an encrypted form. The system serial number on the hard disk drives is encrypted using a second key, different from the first key, and stored in the disk drives in the encrypted form.

In an alternate embodiment, the system serial number is not encrypted. In yet another embodiment, the system serial number is written to the newly installed disk(s) without first checking the serial number previously written on the disk(s).

Figure 3:
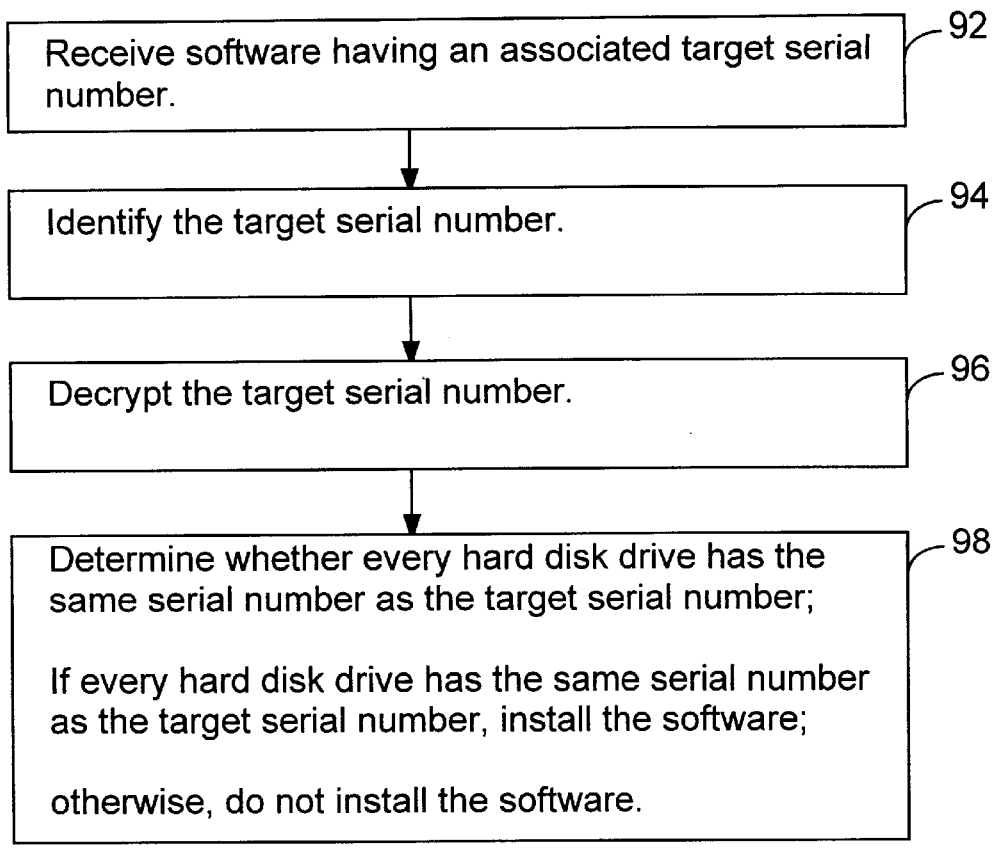
FIG. 3 is a flowchart of a method of installing software in the voice mail server of FIG. 1 in accordance with the present invention.

In FIG. 3, a flowchart of one embodiment of the software installation procedure 66 of FIG. 1 is shown. In step 92, the software installation procedure 66 (FIG. 1) receives system software which has an associated target serial number depending on the medium. In step 94, the software installation procedure 66 (FIG. 1) identifies the target serial number. In step 96, the software installation procedure 66 decrypts the target serial number. In an alternate embodiment, the target serial number is not encrypted and step 96 is omitted.

In step 98, the software installation procedure 66 (FIG. 1) determines whether the disk drive serial number of every hard disk drive 30 (FIG. 1) of the system 10 (FIG. 1) is the same as the target serial number by reading the hard disk drive serial number 34 (FIG. 1) from each hard disk drive 30 (FIG. 1), decrypting the disk drive serial number 34, and comparing the decrypted disk drive serial number to the system serial number. If the disk drive serial number 34 (FIG. 1) of every hard disk drive 30 (FIG. 1) is the same as the target serial number, the software installation procedure 66 installs the software. If not, the software is not installed.

In an alternate embodiment, the disk drive serial number 34 is not encrypted and the decrypting of the disk drive serial number 34 is not performed.

Although step 98 of FIG. 3 states that the disk drive serial number for every hard disk drive in the system is compared to the target serial number, in an alternate embodiment, only the disk drive serial number 34-1 of the master disk is compared to the target serial number. The software installation procedure 66 installs the software based on the results of that one comparison.

In another embodiment, the software installation procedure 66 (FIG. 1) further increases system security by periodically (e.g., once per day, or once per hour, or any other appropriate time interval)checking the serial numbers of all the hard disk drives 30 (FIG. 1) when the voice mail application 60 (FIG. 1) is executing. The software installation procedure 66 (FIG. 1) periodically determines whether the associated target serial number of the new and upgraded software is the same as the disk drive serial number 34 (FIG. 1) of each hard disk drive 30 (FIG. 1). When at least one of the hard disk drives 30 (FIG. 1) has a disk drive serial number different from the associated target serial number of the new and upgraded software, the software installation procedure 66 (FIG. 1) prevents the system 10 (FIG. 1) from accessing the software. In one embodiment the software installation procedure 66 (FIG. 1) uninstalls the software by deleting the new and upgraded software from the system.

Figure 4:
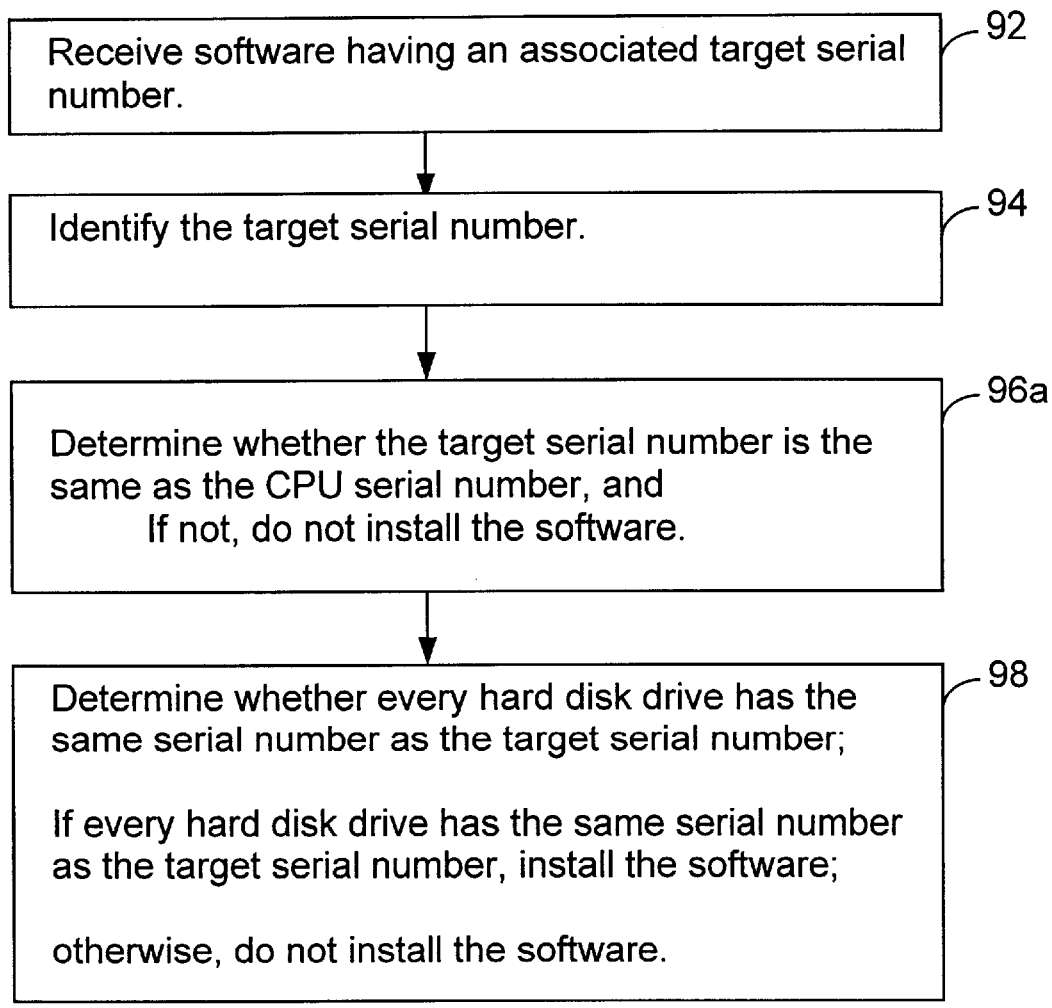
FIG. 4 is a flowchart of the method of installing software in the voice mail server of FIG. 1 in accordance with an alternate embodiment of the present invention.

FIG. 4 is an alternate embodiment of the software installation procedure of FIG. 3 that uses the CPU serial number 13 (FIG. 1) to enhance system security. Steps 92, 94 and 98 are the same as in FIG. 3 and will not be described. After step 94, in step 96a, the software installation procedure 66 determines whether the target serial number from the software distribution medium is the same as the CPU serial number 13 (FIG. 1). If not the installation procedure 66 does not install the software.

In yet another alternate embodiment, software is installed in the system based only on the CPU serial number. Steps 92, 94, and 96a are performed. In step 98, the serial numbers on the hard disk drives are not checked, and the software is installed in the system.

The following pseudo-code further describes an embodiment of the software installation procedure 66 (FIG. 1) of the present invention:

```
authenticate ( )
{
    num_media=read_number_from_media( );
    num_disk=read_number_from_hard_disk( );
    if (num_media==num_disk)
        return(TRUE);
    else
        return(FALSE);
}
main( )
{
    if (authenticate( )==TRUE)
        install_software( );
    else
    {
        perror("Not authorized to install software");
        exit(-1);
    }
}
```

In the above pseudo-code, the authenticate function returns a TRUE if a hard disk drive has the same serial number as the software medium. In a preferred embodiment, the authenticate function is modified to include a hard disk drive parameter to authenticate every hard disk drive in the system.

The main program calls the authenticate function. When the authenticate function returns TRUE, an install_software function installs the software from the software distribution medium to the master disk or other designated disk of the system.

The system has been described with respect to fixed disk drives, that is, the hard disk drives 30. In an alternate embodiment, the disk drives 30 use removable media. In this case, the disk installation procedure 62 writes the system serial number on the removable medium, and the software installation procedure 66 reads the system serial number from the removable medium.

As described above, the present invention is implemented as a computer program product that includes a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of securing software in a computer system having a plurality of fixed disk drives, comprising:

configuring a disk drive serial number of each fixed disk drive of the plurality of fixed disk drives with a predetermined system serial number, such that each fixed disk drive has the same predetermined system serial number;

receiving software with an associated target serial number;

determining whether the associated target serial number of the software is the same as the disk drive serial number on every fixed disk drive of the plurality of fixed disk drives; and installing the software when the serial number on every fixed disk drive is the same as the associated target serial number of the software.

2. The method of claim 1 further comprising:

periodically determining whether the associated target serial number of the software is the same as the disk drive serial number on every fixed disk drive; and preventing the computer system from accessing the software when at least one of the fixed disk drives has a disk drive serial number different from the associated target serial number of the software.

3. The method of claim 2 wherein said preventing uninstalls the software.

4. The method of claim 1 wherein the computer system has a processor with a processor identifier, and the predetermined system serial number is the processor identifier.

5. The method of claim 1 further comprising:

storing the software with the associated serial number on a removable disk, wherein said receiving retrieves the software with the associated serial number from the removable disk.

6. The method of claim 1 wherein said receiving includes retrieving the software with the associated target serial number from a remote computer.

7. The method of claim 1 wherein said receiving includes retrieving the software with the associated target serial number from a remote computer via the Internet.

8. A method of securing software in a computer system having a plurality of fixed disk drives, comprising:

encrypting a predetermined disk drive serial number to provide an encrypted predetermined disk drive serial number;

configuring each fixed disk drive with the encrypted predetermined disk drive serial number, such that each fixed disk drive has the same encrypted predetermined disk drive serial number;

receiving software with an associated encrypted target serial number;

decrypting the associated encrypted target serial number to provide a target serial number;

decrypting the encrypted disk drive serial number of every disk drive to provide a disk drive serial number for each fixed disk drive;

determining whether the target serial number is the same as the disk drive serial number for every fixed disk drive; and installing the software when the target serial number is the same as the disk serial number on every fixed disk drive.

9. The method of claim 8 further comprising:

periodically determining whether the associated target serial number is the same as the disk drive serial number on every fixed disk drive; and preventing the computer system from accessing the software when at least one of the fixed disk drives has a disk drive serial number different from the associated target serial number.

10. The method of claim 9 wherein said preventing uninstalls the software.

11. The method of claim 8 wherein the computer system has a processor with a processor identifier, and the disk drive serial number is the processor identifier.

12. The method of claim 8 further comprising:

storing the software with the target serial number on a removable disk, wherein said receiving retrieves the software with the target serial number from the removable disk.

13. The method of claim 8 wherein said receiving includes retrieving the software with the associated serial number from a remote computer.

14. The method of claim 8 wherein said receiving includes retrieving the software with the associated target serial number from a remote computer via the Internet.

15. A computer program product for use in conjunction with a computer system having a plurality of fixed disk drives, the computer program product comprising a computer readable storage medium and a computer program mechanism embedded therein, the computer program mechanism comprising:

a disk installation procedure that configures each hard disk drive with a predetermined disk drive serial number, such that each hard disk drive has the same predetermined disk drive serial number;

an authenticate disk procedure that determines whether the disk drive has a disk drive serial number that is the same as a target serial number associated with a specified file; and a software installation procedure that receives software with the associated target serial number;

calls the authenticate disk procedure; and installs the software when the authenticate disk procedure determines that the disk drive serial number on every disk drive of the plurality of fixed disk drives is the same as the target serial number associated with the received software.

16. The computer program product claim 15 further comprising instructions that:

periodically invoke the authenticate disk procedure to determine whether the associated target serial number is the same as the disk drive serial number on every disk drive; and prevent the computer system from accessing the software when at least one of the disk drives has a disk drive serial number different from the associated target serial number.

17. The computer program product of claim 16 wherein said instructions that prevent uninstalls the software.

18. The computer program product of claim 15 wherein the computer system has a processor with a processor identifier, and the disk drive serial number is the processor identifier.

19. The computer program product of claim 15 further comprising:
   instructions that store the software with the associated target serial number on a removable disk, wherein the software installation procedure retrieves the software with the associated target serial number from the removable disk.

20. The computer program product of claim 15 wherein the software installation procedure retrieves the software with the associated target serial number from a remote computer.

21. The computer program product of claim 15 wherein the software installation procedure retrieves the software with the associated target serial number from a remote computer via the Internet.

22. A method of securing software in a computer system having a plurality of fixed disk drives, comprising:
   configuring each fixed disk drive with a predetermined disk drive serial number, such that each fixed disk drive has the same disk drive serial number;
   receiving software with a single associated target serial number;
   determining whether the associated target serial number of the software is the same as a disk drive serial number on every fixed disk drive of the plurality of fixed disk drives; and
   installing the software when the serial number on every fixed disk drive of the plurality of fixed disk drives is the same as the associated target serial number of the software.

* * * * *